(12) United States Patent
Bores

(10) Patent No.: US 7,083,211 B1
(45) Date of Patent: Aug. 1, 2006

(54) VEHICLE TRIM PLATE

(76) Inventor: Kevin Bores, 181 North St., Monroeville, OH (US) 44847

( * ) Notice: Subject to any disclaimer, the term of this patent is extended or adjusted under 35 U.S.C. 154(b) by 86 days.

(21) Appl. No.: 10/375,887

(22) Filed: Feb. 27, 2003

Related U.S. Application Data

(60) Provisional application No. 60/359,828, filed on Feb. 27, 2002.

(51) Int. Cl.
*B62D 39/00* (2006.01)
*G09F 21/04* (2006.01)

(52) U.S. Cl. .................. 296/1.08; 296/1.07; 40/591; 40/594; 40/760; D12/173; D12/190; D12/193; D20/13; D20/35

(58) Field of Classification Search .............. 296/1.07, 296/1.08, 1.06; 428/31; 40/413, 591, 910, 40/911, 594, 760; D12/173, 193, 190; D20/13, D20/35, 42

See application file for complete search history.

(56) References Cited

U.S. PATENT DOCUMENTS

| | | | | |
|---|---|---|---|---|
| 1,582,083 | A * | 4/1926 | Peters | 40/591 |
| 3,771,243 | A * | 11/1973 | Rolph | 40/591 |
| 4,172,331 | A * | 10/1979 | Becker | 40/591 |
| 4,217,715 | A * | 8/1980 | Bryan, Jr. | 40/591 |
| 4,363,617 | A * | 12/1982 | Hirsekorn | 425/388 |
| 4,736,539 | A * | 4/1988 | Dickinson | 40/591 |
| 4,775,559 | A * | 10/1988 | Kanamori | 428/31 |
| 5,027,537 | A * | 7/1991 | Freeman et al. | 40/210 |
| 5,308,133 | A * | 5/1994 | Mangum et al. | 296/39.2 |
| 5,381,618 | A * | 1/1995 | Singleton | 40/202 |
| 5,783,265 | A * | 7/1998 | Parkander | 428/13 |
| 5,887,931 | A * | 3/1999 | Bills et al. | 296/39.1 |
| 6,093,278 | A * | 7/2000 | Wade | 156/292 |
| 6,120,083 | A * | 9/2000 | Gunther | 296/78.1 |
| 6,190,026 | B1 * | 2/2001 | Moore | 362/487 |
| D443,852 | S * | 6/2001 | Huang | D12/190 |
| 6,367,181 | B1 * | 4/2002 | Skoog | 40/591 |
| 6,382,821 | B1 * | 5/2002 | Heyer et al. | 362/509 |
| 6,553,695 | B1 * | 4/2003 | Wang | 40/209 |
| 6,659,220 | B1 * | 12/2003 | Kobayashi | 180/68.6 |
| 6,848,204 | B1 * | 2/2005 | Nowak | 40/209 |
| 6,986,918 | B1 * | 1/2006 | Jacobs | 428/14 |

OTHER PUBLICATIONS

Ford Mustang 35th Anniversary Edition, 1999.*
Paper Flames Racing Temperature Control Panel, dated on or before Dec. 25, 2001.*
Aeromach Truck Parts [online]. © 2002, [retrieved on Jul. 1, 2003]. Retrieved from the Aeromach Mfg. Websote using Internet <URL: http://www.aeromach.net/truckParts.html>.
Roadworks Peterbilt Accessories [online]. © 2003, [retrieved on Jul. 1, 2003]. Retrieved from the Roadworks Mfg. Website using Internet <URL: http://www.roadworksmfg.com/Peterbilt/PB_Logo_Trims.htm>.
Roadworks Kenworth Accessories [online]. © 2003, [retrieved on Jul. 1, 2003]. Retrieved from the Roadworks Mfg. Website using Internet <URL: http://www.roadworksmfg.com/Kenworth/KW_Logos.htm>.

* cited by examiner

*Primary Examiner*—D. Glenn Dayoan
*Assistant Examiner*—Greg Blankenship
(74) *Attorney, Agent, or Firm*—MacMillan, Sobanski & Todd, LLC

(57) ABSTRACT

A trim plate for a vehicle having a body portion with an outer face and an inner face. The body portion has at least one opening formed therethrough. The plate includes fastening means for attaching the inner face of the body portion to a surface of the vehicle. The opening formed within the plate is adapted to fit around a symbol on the surface of the vehicle.

8 Claims, 4 Drawing Sheets

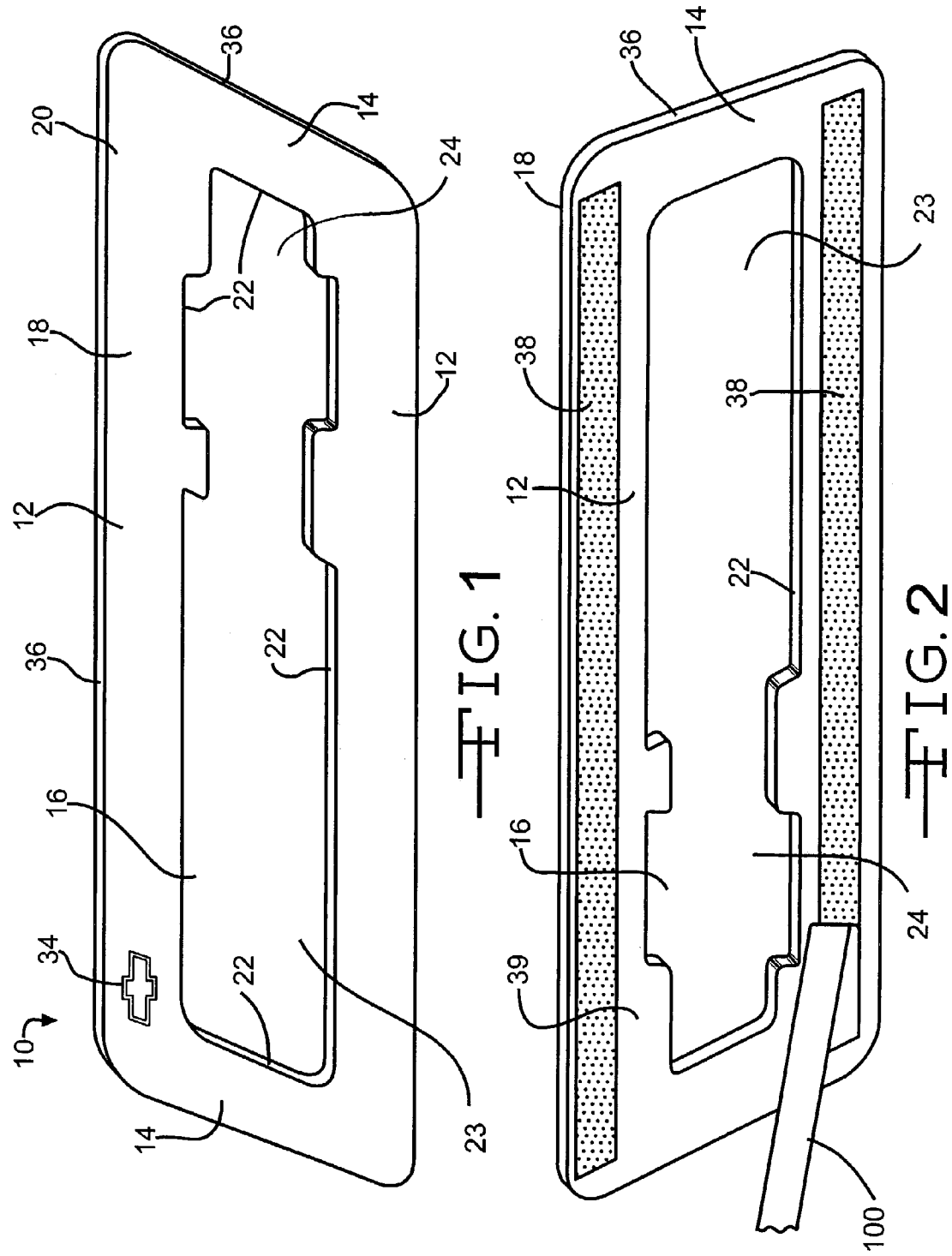

VEHICLE TRIM PLATE

CROSS REFERENCE TO RELATED APPLICATIONS

This application claims the benefit of U.S. Provisional Application No. 60/359,828, filed Feb. 27, 2002, the disclosure of which is incorporated herein by reference.

BACKGROUND OF THE INVENTION

It is common for individuals to enhance the appearance of their vehicles in order to personalize the appearance of the vehicle. In particular, paint, lights, colored trim pieces, spoilers, stickers, and the like are often used to create the effect of improved vehicle appearance. In order to accomplish such appearance enhancements, specialized knowledge is often required. For example, electrical knowledge is required to add neon or custom lighting to a vehicle. Also, for example, to add graphics, chrome or performance wheels, or shock absorbers or to weld a part to a vehicle, some mechanical knowledge would be useful. Without specialized knowledge, an individual might have to spend a large amount of money to have someone with such knowledge do the work for them. Therefore, it would be beneficial to enable someone to accent a vehicle's appearance quickly and easily, regardless of whether they have special training or knowledge about working on such vehicles.

SUMMARY OF THE INVENTION

This invention relates to a trim plate for a vehicle that has a body portion with an outer face and an inner face. The body portion has at least one opening formed therethrough. The trim plate also includes fastening means for attaching the inner face of the body portion to a surface of the vehicle. The opening is adapted to fit around a symbol on the surface of the vehicle. The trim plate opening can be sized and shaped to fit around at least one of the nameplate of the vehicle and the logo of the vehicle. Additionally, the opening of the trim plate body has a first opening portion and a second opening portion formed therethrough. The first opening portion is adapted to fit around the nameplate of the vehicle and the second opening portion is adapted to fit around the logo of the vehicle. The body portion of the trim plate can have a first shape and a first size and the opening can have a second shape and a second size. The first shape and second shape can be different shapes. The body portion of the trim plate can have a plurality of openings formed therethrough where each of the openings are separated by a plurality of dividers that extend from the body portion of the plate. The dividers could extend continuously between one inner edge of the body portion and a second edge of body portion.

In an alternate embodiment, a method for decorating a vehicle includes identifying a symbol on the vehicle, providing a trim plate that is adapted to fit over the symbol, the trim plate having fastening means attached to the plate for fastening the plate to the vehicle, placing the trim plate about the symbol, fastening the trim plate to the vehicle using the fastening means. The fastening means could be at least one piece of adhesive tape, where the adhesive tape has an adhesive surface adapted to attach the tape with a surface, and the adhesive surface is covered by a removable protective strip. The method could also include the step of removing the protective strip from the adhesive surface prior to attaching the trim plate to a vehicle.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a perspective view of an outer face of a first embodiment of a vehicle trim plate in accordance with this invention.

FIG. 2 is a perspective view of an inner face of the first embodiment of the vehicle trim plate illustrated in FIG. 1.

FIG. 4A is an enlarged elevational view of a portion of the vehicle and the third embodiment of the vehicle trim plate illustrated in FIG. 4.

DETAILED DESCRIPTION OF THE PREFERRED EMBODIMENTS

Figure 3:
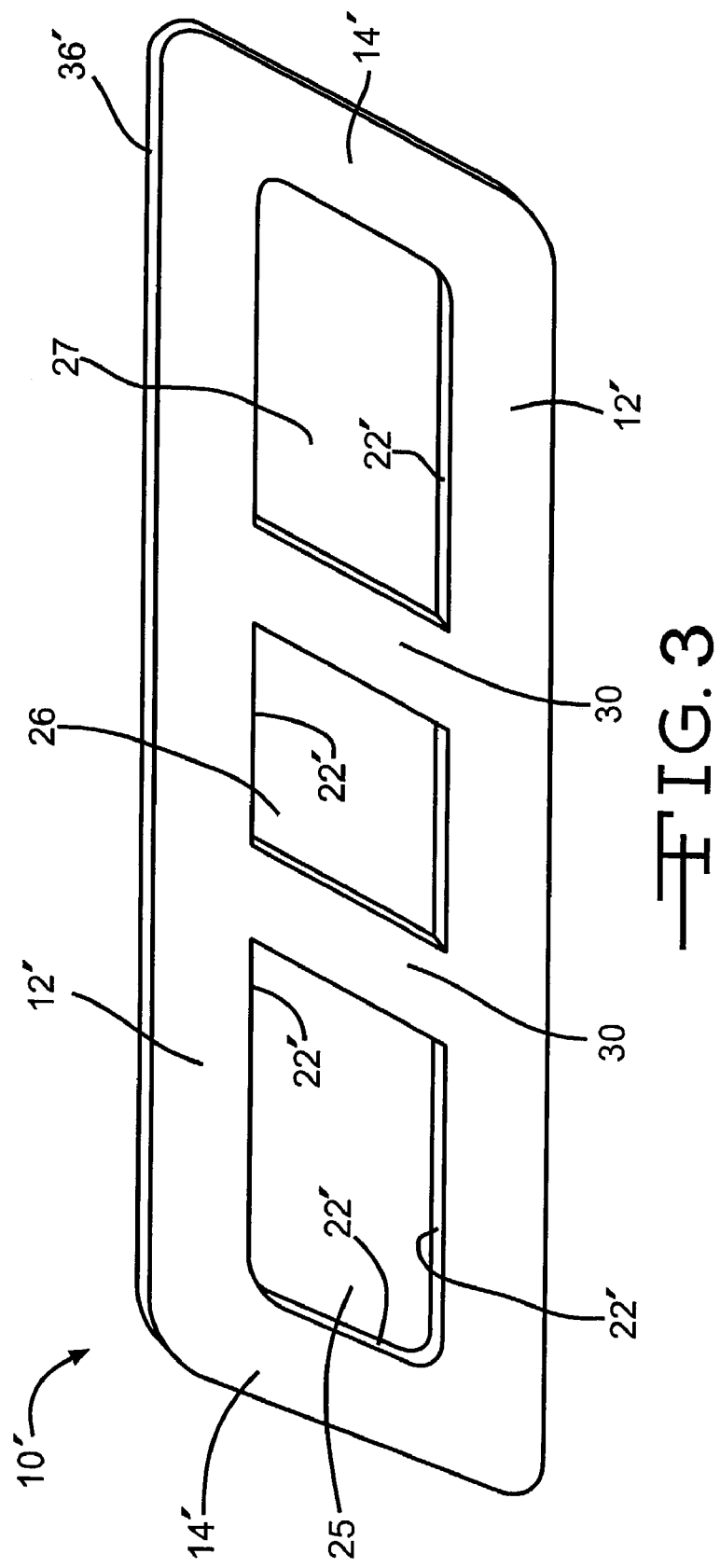
FIG. 3 is a perspective view of an outer face of a second embodiment of a trim plate in accordance with this invention.

Referring now to the drawings, there is illustrated in FIG. 1 a first embodiment of a vehicle trim plate, indicated generally at 10. The trim plate 10 is a relatively thin, multi-sided part including two pairs of sides 12, 14 that define an opening 16. In a preferred embodiment, the plate 10 has two relatively long sides 12 and two relatively short sides 14 that are connected to the relatively long sides 12 at their respective ends. The four sides 12, 14 define a body 18 of the trim plate 10. It should be appreciated that the trim plate 10 can have any number of sides, shapes, and dimensions and may further be formed having any desired thickness. In the illustrated embodiment, the two relatively long sides 12 are generally parallel to each other, and the two relatively short sides 14 are generally parallel to each other. The opening 16 is polygonal in shape and, in the illustrated embodiment, is specifically adapted to fit about a particular symbol on a vehicle. It is understood that the body portion 18 and opening 16 of the trim plate 10 can be formed having any desired shape or size. As will be described below, it is preferred that the shape of the trim plate 10 or the opening 16 be adapted to fit over a symbol on a vehicle. A first side 20 or outer face of the trim plate 10 is shown in FIG. 1. In the illustrated embodiment, the body portion 18 of the trim plate 10 is formed as a relatively thin sheet or piece of material. For example, the body portion 18 of the trim plate 10 can be formed from a metal that is lightweight, rigid, durable, and relatively inexpensive to manufacture. It is further preferred that the material be corrosion-resistant, such as stainless steel, or be adapted to be corrosion-resistant by being treated or coated. However, the body portion 18 of the trim plate 10 can be formed from any desired material such as, for example, steel, plastic, or rubber.

In the illustrated embodiment of the trim plate 10, the opening 16 formed through the body portion 18 of the trim plate 10 is relatively large and multi-sided. The inner edges 22 of the sides 12, 14 of the trim plate 10 define the opening 16. Preferably, such an opening 16 is sized and shaped to quickly and easily be positioned about a decorative symbol, such as a vehicle logo or nameplate, on the vehicle. It can be appreciated that the opening 16 may be formed having any desired size and shape. Additionally, the opening 16 can have a different size and shape than the body portion 18. For example, an oval-shaped body portion can have a rectangular opening, and vice versa. In addition, the thickness of the side members 12, 14 could vary along their respective lengths creating a non-uniformly shaped opening. In the illustrated embodiment of the trim plate 10, the opening 16 of the trim plate 10 is shaped to fit over a logo and nameplate of a CHEVROLET® SILVERADO® truck. A first portion 23 of the opening 16 is adapted to fit about the SILVERADO® portion of the nameplate, and a second portion 24 of the opening 16 is shaped to fit over the CHEVROLET® logo portion of a nameplate. The words SILVERADO®, CHEVROLET®, and the CHEVROLET® logo are registered trademarks of the General Motors Corporation. It can be appreciated that the size, shape, text, and other characteristics of the logo or nameplate can be different than shown. Also, it is contemplated that the trim plate 10 of the present invention can be adapted to fit about the logos and nameplates of any vehicle.

The embodiment of the trim plate 10 illustrated in FIGS. 1 and 2 shows the trim plate 10 as a continuous piece that can border a vehicle nameplate. However, the trim plate 10 can also be formed by a plurality of separate pieces (not shown). The separate pieces of trim could be used to accent larger or smaller sized portions of a vehicle, such as the door handles, trunk release handle, bumper trim, or any other portion of a vehicle. Separate trim pieces can also be used to underline, highlight, or accent other areas of a vehicle as well. Additionally, each separate piece can be independently attached to the vehicle.

The body portion 18 may optionally have one or more identifying indicia 34 provided thereon to further decorate the trim plate 10. In the embodiment illustrated in FIG. 1, the body portion 18 of the trim plate 10 has the CHEVROLET® logo provided thereon. However, the identifying indicia 34 could also be numbers, letters, icons, colors, and geometric shapes. Additionally, the identifying indicia 34 can also be provided having different type fonts or other non-vehicle specific labeling. Furthermore, combinations of any such indicia 34 may also be used if desired. It is preferred that the identifying indicia 34 correspond to the vehicle to which the trim plate 10 is attached. For example, as with the illustrated embodiment, the trim plate 10 is adapted to fit about the nameplate of a CHEVROLET® SILVERADO® truck. Therefore, the identifying indicia 34 thereon is preferably the CHEVROLET® logo. While the embodiment has been illustrated in FIGS. 1 and 2 as being adapted for a CHEVROLET® SILVERADO® pickup truck, it should be understood that the trim plate 10 of the invention can be adapted to fit about the nameplate or logo of any vehicle, including automobiles, trucks, sport utility vehicles, busses, vans, semi-trucks, boats, airplanes, or any other vehicle.

The body portion 18 of the trim plate 10 may also be adapted to have designs incorporated on outer edges 36 of the sides 12, 14. Therefore, although the outer edges 36 of the trim plate 10 are shown having a generally smooth and uniform surface, it can be appreciated that the outer edges 36 can have any shape. Particularly, the outer edges 36 could be shaped to form symbols, letters, words, or shapes. For example, the opening 16 would be adapted to fit over a logo of a vehicle and one or more outer edges 36 of the trim plate 10 could be shaped in the form of flames, lightning, the owner's name, cartoon characters, or have any other desired shape or pattern.

Referring now to FIG. 2, there is illustrated a second side 39 or inner face of the vehicle trim plate 10 shown in FIG. 1. Also shown in FIG. 2 are a pair of relatively long strips of tape 38. The tape 38 preferably has adhesive material on both sides, with removable protective strips 100 attached thereto. Such double-sided adhesive tape 38 is conventional in the art. The protective strip (not shown) on one side of the tape 38 can be removed so that the tape 38 can be attached to the inner face 39 of the trim plate 10. The protective strip 100 on the other side of the tape 38 can also be removed to expose the adhesive surface prior to attaching the trim plate 10 to the surface of the vehicle. It is preferred that more than one piece of tape 38 be placed on the trim plate 10 to provide a more secure attachment between the trim plate 10 and the vehicle. Although two long strips of tape 38 are shown to make this adhesive attachment between the trim plate 10 and the vehicle, it is understood that a single continuous strip or several small, spaced apart pieces of tape 38 can be used to secure the trim plate 10 to the vehicle. Additionally, the trim plate 10 can be affixed to a vehicle by threaded fasteners or adhesives. It is also understood that any means of temporarily or permanently affixing the trim plate 10 to the vehicle can be used without departing from the spirit or scope of the invention.

Illustrated in FIG. 3 is a second embodiment of a trim plate, indicated generalyl at 10', in accordance with this invention. The trim plate 10' is similar to the trim plate 10. However in this embodiment, the opening is formed as a plurality of non-continuous openings 25, 26, 27 that are defined by dividers 30 extending from an inner edge 22' of one side 12' of the trim plate 10' to an inner edge 22' of another side 12'. The dividers 30 can be oriented in any desired manner or direction relative tot he trim plate 10'. It can also be appreciated that the dividers 30 can extend from one side 12' or 14' back to the same side 12' or 14'. The dividers 30 could also be straight or curved, and may have different thicknesses, widths, or other dimensions. Thus, the dividers 30 can create multiple openings 25, 26, and 27 within the trim plate 10'. The multiple openings 25, 26, and 27 can be designed to fit about a symbol that has multiple parts. For example, some vehicles use multiple words or logos as a part of a symbol. Therefore, the divided trim plate 10' would separately border each of the multiple components of the symbol with the divider 30 extending between the adjacent symbols. It is anticipated that the means of attaching the second embodiment of the trim plate 10' are substantially similar to the means of attachment described above with respect to the embodiment shown in FIGS. 1 and 2.

Figure 4:
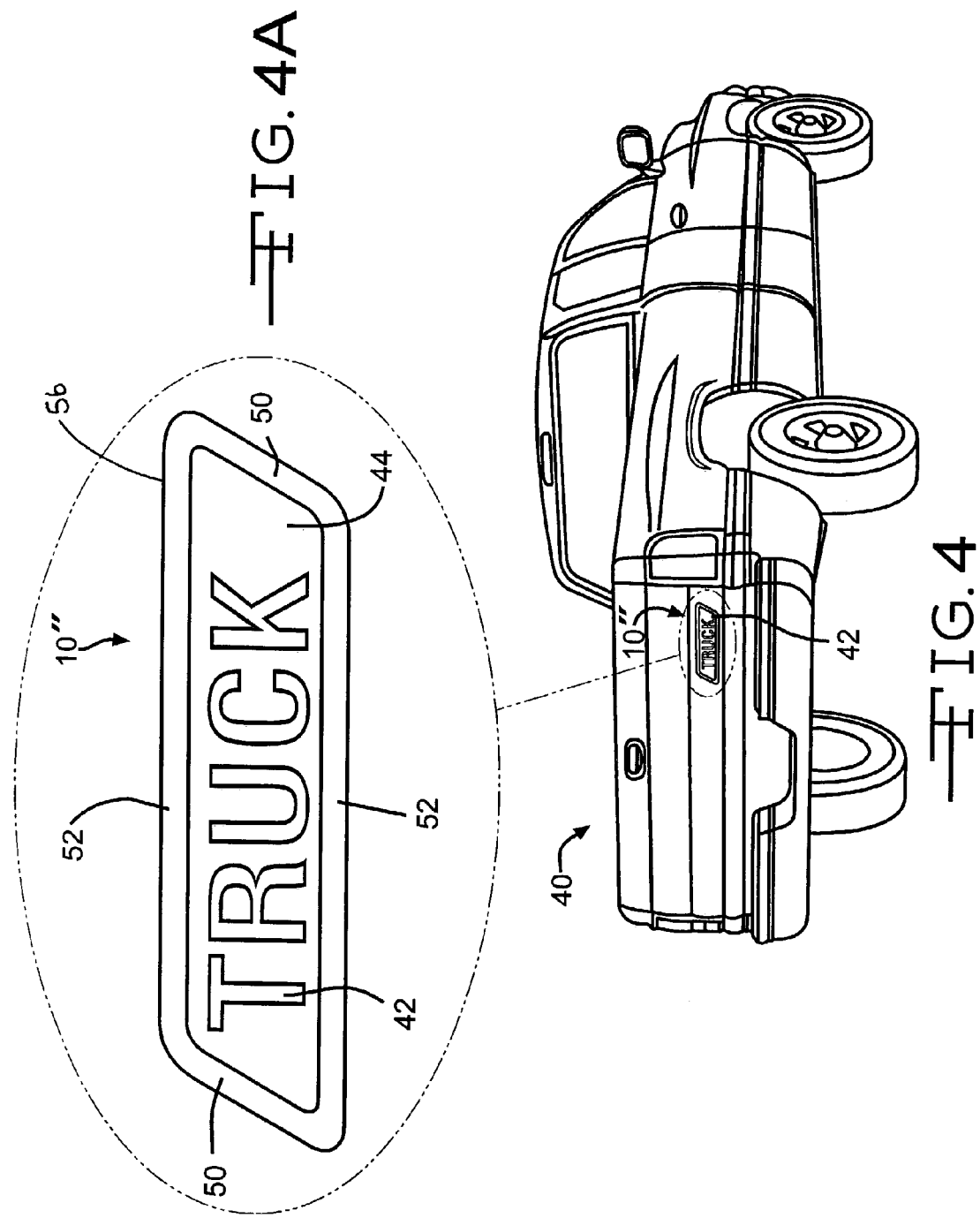
FIG. 4 is a perspective view of a vehicle having a third embodiment of a trim plate in accordance with this invention installed thereon.

Referring now to FIG. 4, there is illustrated a perspective view of a vehicle, indicated generally at 40, having a third embodiment of a trim plate 10" installed thereon. FIG. 4A is an enlarged view of a portion of the vehicle 40 and the trim plate 10". The vehicle 40 has a nameplate 42 affixed thereto. Generally, such a nameplate 42 is installed by the vehicle manufacturer and identifies the make and model of the vehicle. The trim plate 10" is similar to the trim plate 10 illustrated in FIG. 1 in that the trim plate 10" is a relatively thin, multi-sided part including two pairs of sides 50, 52 that define an opening 44. In a preferred embodiment, the plate 10" has two relatively long sides 52 and two relatively short sides 50 that are connected to the relatively long sides 52 at their respective ends. The four sides 50, 52 define a body 56 of the trim plate 10". It can be appreciated that the trim plate 10" can have any number of sides, shapes, dimensions, and thickness. In this embodiment of the invention, the opening 44 of the trim plate 10" has the same general shape as the body portion of the trim plate. The trim plate 10" is preferably attached over the nameplate 42 of the vehicle 40. The nameplate 42 is generically labeled "TRUCK". However, it will be appreciated that many vehicles use specific names to identify the make or model of the vehicle. Thus, the opening 44 can be adapted to fit about the specific shape of a particular nameplate. Additionally, while the trim plate 10" is shown attached to the back of the pickup truck 40, it is understood that any symbol, such as a logo or nameplate (or any other area to be accented on a vehicle with a trim plate), can be located anywhere on the vehicle 40. The trim plate 10" can also be positioned as desired and placed about any part of a vehicle that fits within the opening 44 of the trim plate 10". It is preferred that the trim plate 10" be attached to the vehicle in a manner substantially similar to the method of attachment described above.

Figure 5:
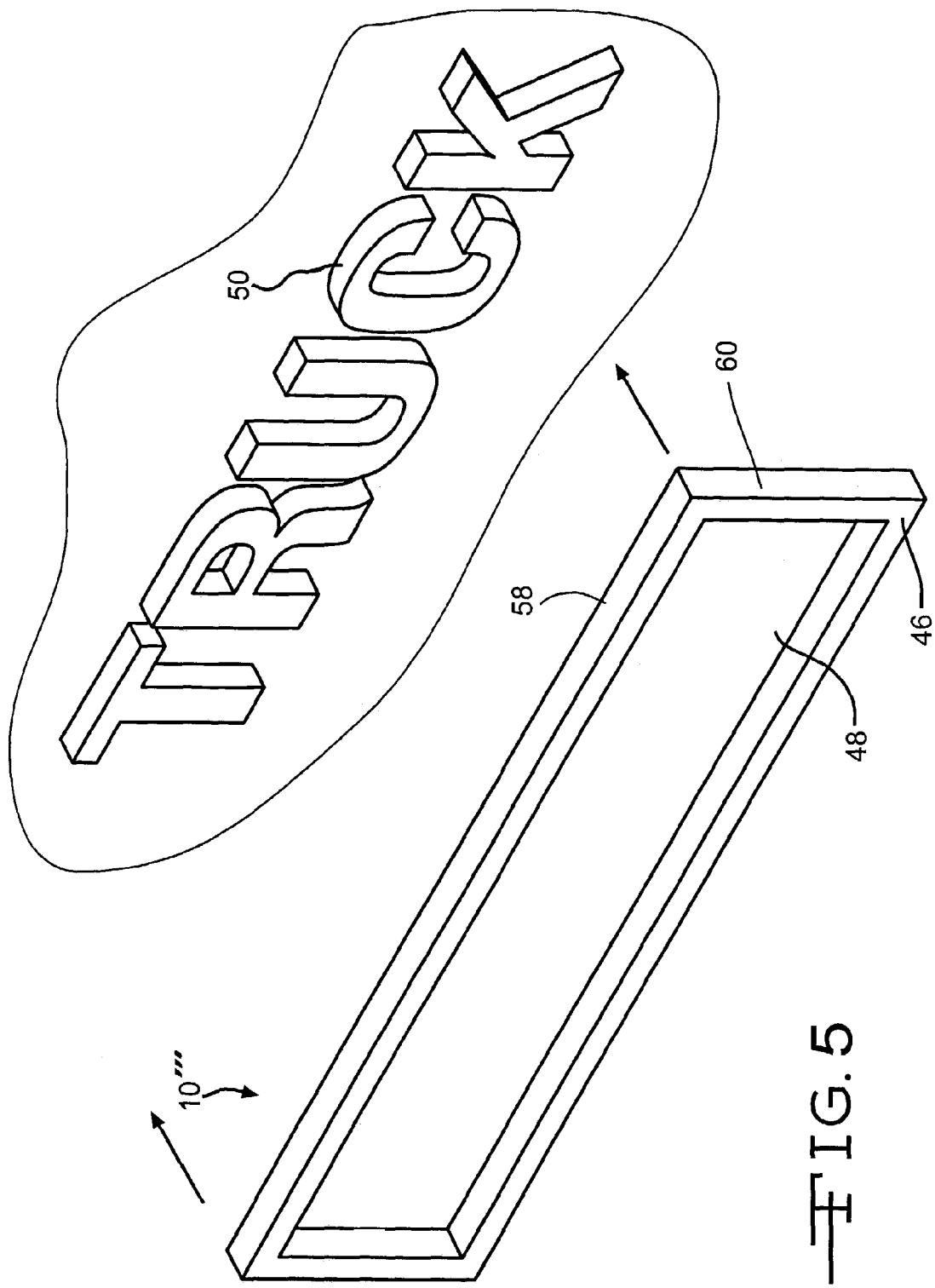
FIG. 5 is an exploded perspective view of a fourth embodiment of a vehicle trim plate being installed about a vehicle logo in accordance with this invention.

Shown in FIG. 5 is an exploded view of a fourth embodiment of a trim plate 10''' being installed about a vehicle symbol. The trim plate 10''' is a relatively thin, generally rectangular part including two pairs of sides 58, 60 that define an opening 48. The opening 48 is also generally rectangular and is preferably sized to fit about a vehicle nameplate 50. In a preferred embodiment, the plate 10''' has two relatively long sides 58 and two relatively short sides 60 that are connected to the relatively long sides 58 at their respective ends. The four sides 58, 60 define a body 46 of the trim plate 10'''. It can be appreciated that the trim plate 10''' can have any number of sides, shapes, and dimensions and may further be formed having any desired thickness. Also illustrated in FIG. 5 is a generic vehicle nameplate 50. As mentioned above, the nameplate 50 is typically installed on a vehicle by the vehicle manufacturer to identify the make and model of the vehicle. The opening 48 is preferably sized and shaped to fit about the nameplate 50. Further, the trim plate 10''' is adapted to be installed about the nameplate 50 as indicated in FIG. 5 and by the method described below.

The method of the present invention can be described as having a first step, where an individual identifies a location on the vehicle (for example, a nameplate 50) having a shape and size that a trim plate 10''' is adapted to be installed about. In a second step, an individual removes at least one protective strip (as identified as element 100 in FIG. 2) from an adhesive tape (as identified as item 38 in FIG. 2). If there are multiple protective strips, the individual can remove each protective strip. The individual then places the trim plate 10''' about the nameplate 50, logo or whatever item the trim plate 10''' is shaped to be placed about. The adhesive retains the trim plate 10''' with the vehicle for decoration and accenting.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method for decorating a vehicle comprising the steps of:
   (a) providing a vehicle including an exterior panel having a symbol provided thereon;
   (b) providing a trim plate including a rigid body portion having an outer face, an inner face having an adhesive thereon, and at least one opening formed therethrough;
   (c) orienting the trim plate such that the opening is disposed about the symbol provided on the exterior panel of the vehicle; and
   (d) moving the adhesive on the inner face of the trim plate into engagement with the exterior panel of the vehicle such that the trim plate is secured to the exterior panel of the vehicle and the opening extends about the symbol provided on the exterior panel of the vehicle.

2. The method defined in claim 1 wherein said step (a) is performed by providing the vehicle including the exterior panel having the symbol secured thereto.

3. The method defined in claim 1 wherein said step (b) is performed by providing the trim plate having a single opening formed therethrough, and wherein said step (c) is performed by orienting the trim plate such that the single opening is disposed about the symbol provided on the exterior panel of the vehicle.

4. The method defined in claim 1 wherein said step (b) is performed by providing the trim plate having a plurality of openings formed therethrough, and wherein said step (c) is performed by orienting the trim plate such that one of the plurality of openings is disposed about the symbol provided on the exterior panel of the vehicle.

5. The method defined in claim 1 wherein said step (b) is performed by providing the inner face of the trim plate with a tape having an adhesive on both sides thereof.

6. The method defined in claim 1 wherein said step (b) is performed by providing the inner face of the trim plate with a plurality of tapes, each tape having an adhesive on both sides thereof.

7. The method defined in claim 1 wherein said step (c) is performed by orienting the trim plate such that the opening is disposed about the symbol provided on the exterior panel of the vehicle and the trim plate does not engage any portion of the symbol.

8. The method defined in claim 1 wherein said step (a) is performed by providing the symbol with a predetermined shape, and wherein said step (b) is performed by providing the opening through the trim plate with a shape that corresponds to the shape of the symbol.

* * * * *